United States Patent [19]

Pekelsky

[11] Patent Number: 4,459,026

[45] Date of Patent: Jul. 10, 1984

[54] VIEWING AND MEASURING APPARATUS

[75] Inventor: James R. Pekelsky, Ottawa, Canada

[73] Assignee: Canadian Patents & Development Limited, Ottawa, Canada

[21] Appl. No.: 384,713

[22] Filed: Jun. 3, 1982

[30] Foreign Application Priority Data

Aug. 21, 1981 [CA] Canada .................................. 384422

[51] Int. Cl.³ ............................................. G01B 9/02
[52] U.S. Cl. .................................... 356/356; 356/363
[58] Field of Search .............. 356/354, 355, 356, 363; 250/237 G; 350/162.12, 162.15, 162.23

[56] References Cited

U.S. PATENT DOCUMENTS

| 3,614,212 | 10/1971 | Hock | 250/237 G X |
| 3,729,830 | 5/1973 | Blachat et al. | 350/136 X |
| 3,756,723 | 9/1973 | Hock | 250/237 G X |
| 3,891,321 | 6/1975 | Hock | 356/356 |
| 3,996,463 | 12/1976 | Jablonowski | 356/398 X |

Primary Examiner—William L. Sikes
Assistant Examiner—Matthew W. Koren
Attorney, Agent, or Firm—Ronald G. Bitner

[57] ABSTRACT

An apparatus for viewing and measuring using a partially reflective grating superimposed with the object. The invention provides efficient separation of viewing and measurement spectra from a common axis for a clear view of the object in conjunction with an accurate interferometric measuring system.

5 Claims, 4 Drawing Figures

VIEWING AND MEASURING APPARATUS

BACKGROUND OF THE INVENTION

This invention relates to a viewing and measuring apparatus, and specifically to an apparatus wherein the measuring point is substantially coincident with the viewing point.

Simple comparators are known in which a measuring scale or grid is superimposed with the object. These devices are relatively coarse scales, and attempting to increase precision and accuracy further by finer division of the scale results in an obscured view of the object. Such a device is not adaptable to the high precision automated measuring instruments to which the present invention is addressed.

Precise and accurate optical measuring devices, per se, are known. For example, U.S. Pat. No. 3,996,463, to Jablonowski, describes the use of grating interferometry to monitor relative movement between a beam of coherent light and a grating. U.S. Pat. No. 3,904,401 to Hock et al, describes an interferometric measuring system without systematic markings on the measuring surface. However, neither system provides for viewing of an object to be measured. Moreover, as will be described, attempting to add viewing capabilities to such a system presents a number of difficulties, particularly if the object is to be superposed with the grating.

Optical measuring systems are known which provide a view of the object being measured. U.S. Pat. No. 3,729,830, to Blachut et al, uses encoding devices that are offset from the viewing ones to allow a clear view of the object. A viewing mark or dot provided by the viewing optics represents the points on the object to which coordinate measurements are related. The accuracy of measurement is limited by the stability of the mechanical linkage between the viewing system and the measuring system, when translated, due, for example, to bearing freeplay and runout, and deformation of linkage elements.

In attempting to provide suitable viewing capabilities for an interferometric system without loss of measurement accuracy, a number of difficulties are encountered. As indicated above, the conventional approach of keeping the viewing and measuring systems physically separate, has accuracy limits due to mechanical guidance errors which are very difficult to improve further. On the other hand, physical superpositioning of the object and grating produces undesirable visible effects in the viewing system. Although grating lines per se, can be made invisible in the viewing system, leakage of the measurement beam into the viewing channel produces distracting pulsing of the beam intensity in the viewing system when translating the object-grating unit. Also, the conventional approach for multiplexing an optical signal for independent utilization, e.g. viewing and measuring, involves the use of broadband beamsplitters which reduces the signal by at least 50% for each pass, significantly reducing optical efficiency. Another approach for multiplexing is using frequency-separated carriers (coloured channels) coupled and uncoupled by dichoic beamsplitters. This provides improved efficiency for one channel but imposes chromatic restrictions. The performance is further degraded if one of the channels is broadband as is typical for a viewing system which the present invention incorporates.

SUMMARY OF THE INVENTION

An object of the present invention is to provide a viewing and measuring apparatus wherein the measuring point is substantially coincident with the viewing point.

Another object of the present invention is to provide a viewing and measurement apparatus wherein the viewing and measurement spectra are efficiently multiplexed along a common optical axis.

The present invention comprises a viewing system having an optical viewing axis which intersects the object at a viewing point; an interferometric measuring system having an optical measuring axis which intersects the object at a measuring point; optical modulating means superposed with the object, said modulating means providing relatively high spacial frequency content matching that of the measuring system; reflective means superposed with said object for providing at least partial reflection of incident spectra; means for supporting the viewing system and the measuring system relative to one another such that the viewing system axis and measuring system axis intersect the object substantially coaxially and normally, whereby the viewing point and measuring point are substantially coincident; means providing that a spacial frequency plane of the viewing system is substantially optically coplanar with a spacial frequency plane of the measuring system to define a common spacial frequency plane, at which plane relatively high frequency spectra operatively associated with measurement are spacially separated outwardly from relatively low frequency spectra operatively associated with viewing; reflecting means optically associated with the spacial frequency plane for selectively deflecting the high and the low frequency spectra from each other to effect axial separation thereof and, whereby the separated low frequency spectra can be utilized in said viewing system; said measuring system including photo detection means fixed relative to the viewing-measuring axis for receiving separated high frequency spectra reflected from the surface of the grating; and, means for translating the object relative to the viewing-measuring axis within the object plane to effect visual translation of the object in the viewing system while interferometrically measuring the translation.

DESCRIPTION OF PREFERRED EMBODIMENTS

Figure 1:
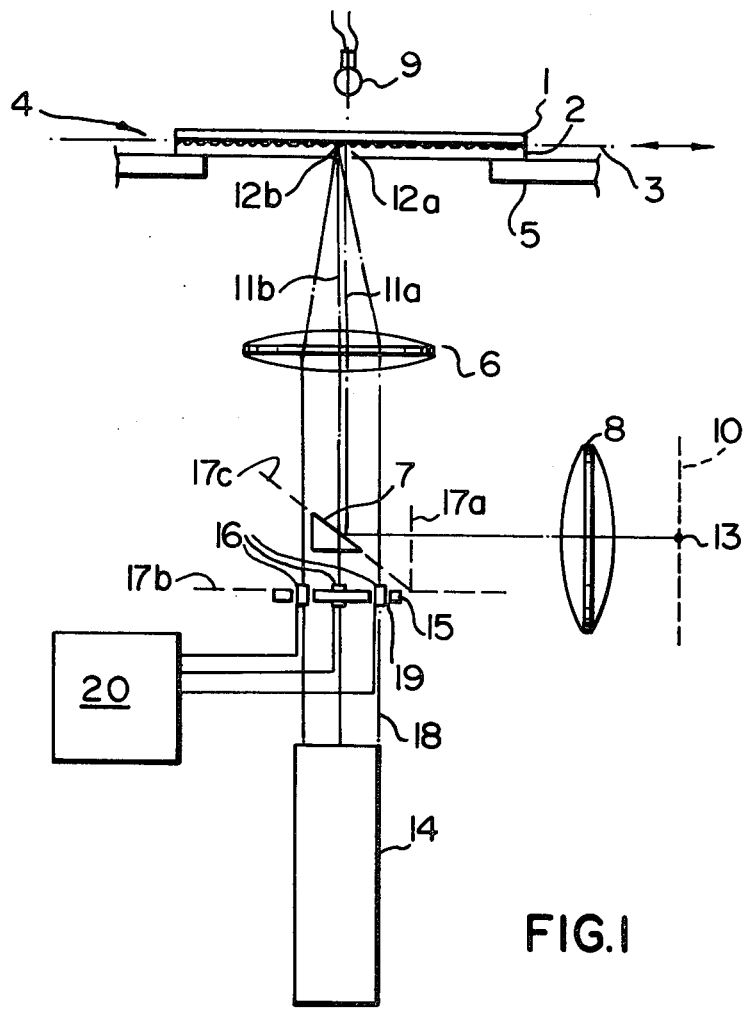
FIG. 1 is a schematic representation of one embodiment of the present invention.

FIG. 1 illustrates one embodiment of an apparatus for viewing and measuring an object 1. Superposed with the object 1 is a grating 2 with a partially reflective grating surface, such that the object and the grating are substantially in the same plane 3. The superposed object 1 and grating 2 together define an object-grating unit 4. The object-grating unit 4 is shown supported on supporting structure 5 adapted to be translated laterally within the object plane 3.

Preferably, the object 1 and grating 2 will be arranged such that the grating surface of the grating 2 is in proximity with the surface of the object 1 being examined, in order to minimize the superposition error, i.e., the separation due to the grating and object thickness.

The apparatus of FIG. 1 includes a viewing system and a measuring system.

The viewing system as shown comprises a transparent object 1, an objective lens 6, reflecting means 7, imaging lens 8, illumination source 9, and image plane 10. The optical axis 11a of the viewing system intersects the object 1 at a viewing point 12a. A viewing mark 13 centered in the image plane 10 represents the viewing point 12a to a viewer. It will be understood that the viewing system components shown may form the front-end of a more complex image processing and/or viewing system.

The measuring system of the present invention incorporates an interferometer, the operating principle of which is known in the art, (see, for example, the aforesaid Jablonowski patent).

Figure 2:
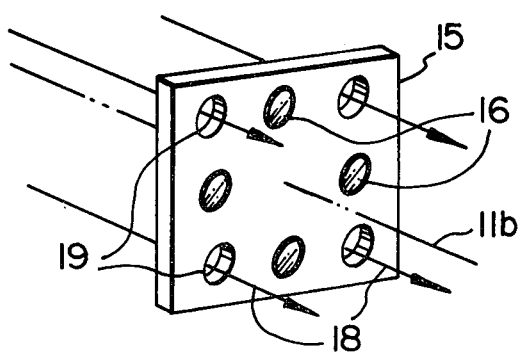
FIG. 2 is an enlarged perspective representation of the aperture plate and detector assembly shown in FIG. 1.

The measuring system as shown in FIG. 1 comprises a beam source 14, an aperture plate 15, the objective lens 6, the grating 2 with partially reflective surface, and photo-detector means 16, all of which are aligned along an optical axis 11b, which intersects the object at a point 12b, herein referred to as the measuring point. The beam source 14 provides multiple beams 18 that are made to interfere at the grating 2. FIG. 2 shows the aperture plate passing four beams, three or more being required for a two-dimensional system. The component beams are substantially monochromatic and have a specific spacial orientation, phase and polarization relationship dependent on system configuration. Beam sources may employ masked, expanded laser beams, as in the aforesaid Jablonowski patent, or diffraction orders emitted from gratings, as in the Hock et al patent.

The components of the viewing and measuring system are supported relative to one another such that the viewing point 12a and measuring point 12b are made substantially coincident, and the viewing system axis 11a and measuring system axis 11b are substantially coaxial. It should be noted that FIG. 1 shows the axes 11a and 11b, and points 12a and 12b, displaced from one another only to facilitate representation.

Since the object and grating are substantially in the same plane, both the viewing system and measuring system have a common spacial domain at the object plane 3. By virtue of the shared optical element, the objective lens 6, both systems transform into a common spacial frequency domain at plane 17b. For the viewing system, the spacial frequency domain also exists at plane 17a. The plane 17a and 17b are rendered optically equivalent by placing the reflecting means 7 in the bisecting plane 17c. In this manner, the spacial frequency planes of the two systems are made optically coplanar.

In the spacial frequency plane 17b, different spacial frequencies are separated spacially from one another with the relatively high frequency spectra, associated with measurement, being located outward from the relatively low frequency spectra associated with viewing. This separation exists when the grating lines are at least twice as fine as the smallest feature to be resolved in the viewing system.

To maintain separation of the low frequency spectra from the high for independent utilization, reflective means 7 is arranged to deflect the low frequency spectra from the axis of high, at the spacial frequency plane 17b. The axially separated, low frequency spectra can then be utilized, e.g. viewed at 10, free from the modulation effects of the measurement spectra. It should be noted that separation is achieved with high optical efficiency when compared with the use of either broadband or dichroic beamsplitters for this purpose. Using a beamsplitter results in at least 50% loss of signal for viewing and/or measurement, while the present invention incurs no significant loss of signal at this stage for either viewing or measuring.

In the measuring system, beams 18 from source 14 are passed through apertures 19 in the aperture plate 15, which lies in the spacial fequency plane 17b. The beams 18 are Fourier transformed into the spacial domain plane 3 at the grating 2 by the objective lens 6. The reflected beams, reflected from the partially reflective surface of the grating, are then transformed again, by lens 6, into a conjugate frequency domain at plane 17b for detection by photodetectors 16, which are also located in plane 17b. As can be seen in FIG. 2, the photodetectors can be conveniently mounted in the aperture plate 15. Associated with the detectors are suitable processing means 20.

The measurement system components are configured such that there is a characteristic system spacial frequency upon which correlation is made in the object plane. This characteristic frequency must be present in the object plane and is most effectively provided by a matched grating. Alternatively, as disclosed in the aforesaid Hock patent, the ambient spacial frequency content of an object may be utilized to function as the grating element. Although the signal will be less than that of a conventional grating, it may be adequate for certain applications, such as where large objects are involved. The measurement technique, per se, is known in the art and involves detection and counting the cycles of variation in light intensity reflected from the reflective object surface as it is translated within the plane 3.

Figure 4:
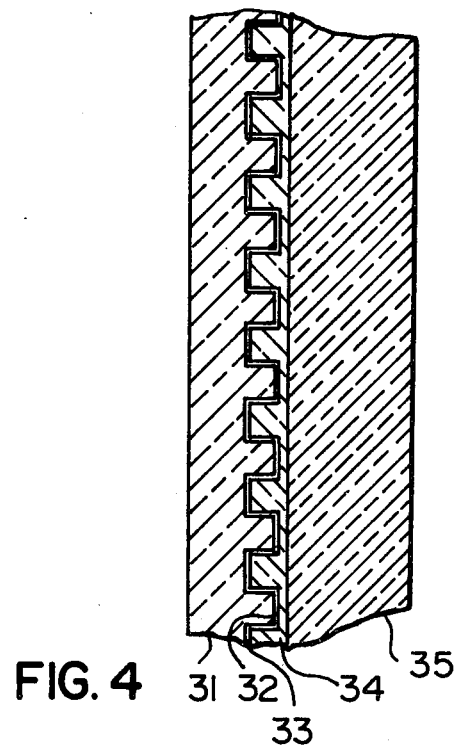
FIG. 4 is a cross-sectional enlarged view of a preferred embodiment of an object-grating unit.

The grating may take various forms, and will preferably be of the type optimized to reflect the selected diffration orders. FIG. 4 shows the preferred construction of a grating 31 in relation to an object 35. The grating substrate 31 has a coating 33 of reflective material on the grating surface 32 designed to provide partial reflection and partial transmission. Over the coating 33 is a layer 34 of material having a refractive index matching that of the grating substrate, adapted to provide a planar outer surface for superposing with the object 35. This composite structure performs as a typical grating in reflected light, but it prevents the formation of transmitted side orders since the grating effect of periodic phase modulation is nulled by the layer 34. The absence of replicated transmission spectra permits utilization of a wider bandwidth of viewing spectra, with spacial frequencies approaching that of the grating.

The embodiment shown in FIG. 1 is arranged for transparent objects, such as photographic transparencies. The embodiment of FIG. 3 may be used for either transparent or non-transparent objects.

Figure 3:
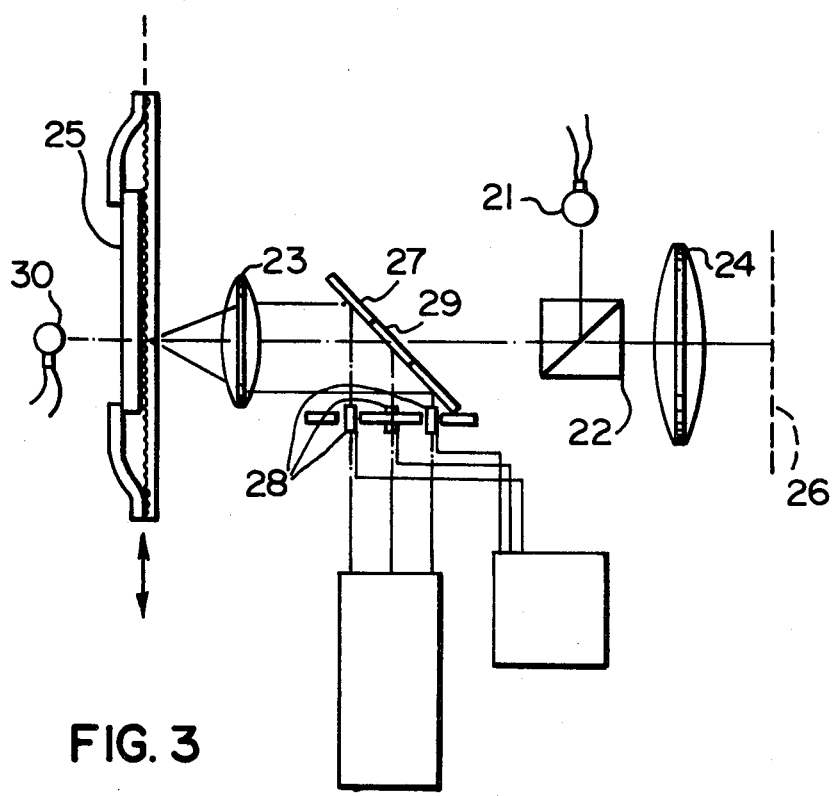
FIG. 3 is a schematic representation of an alternate embodiment of the present invention.

For non-transparent objects, the viewing system comprises illumination source 21, beamsplitter 22, objective lens 23, and imaging lens 24 for viewing the object 25 at 26. FIG. 3 shows an annular deflecter 27 that deflects the outer high frequency spectra to be detected by photo detectors 28, while the low frequency spectra passes through the central opening 29.

In the case of transparent objects, illumination source 30 may be used, and illumination source 21 and beamsplitter 22 are then not required.

The object and grating may take various forms. For example, the grating may be combined with the object to form an integrated unit similar to that illustrated in FIG. 1, or, as in FIG. 3, the grating may be incorporated into a supporting element on which the object is placed. Also, as already described, the ambient spacial frequency content of the object itself can be utilized, eliminating the requirement for a discrete grating element. Similarly, the ambient reflectivity of the object may be utilized, eliminating the requirement for a separate reflective layer.

It will be understand that viewing will not necessarily be done by an operator but may, for example, be performed by a suitable photo-receptive device. In such application, the viewing mark would be omitted. It will also be apparent that the viewing optics may be used in reverse, to generate a pattern on a photo-sensitive object, for example. In any application, the present invention will provide separation of measurement spectra from the "viewing" system.

It will, also, be apparent that the position of the viewing illumination and imaging optics can be reversed, by introducing an additional objective lens into the viewing system. In either case, the spectra of each system are efficiently multiplexed since an unmodulated illumination source has a spacial frequency of zero.

Claim:

1. A viewing and measuring apparatus for a substantially planar object comprising:
   (a) a viewing system having an optical viewing axis which intersects the object at a viewing point;
   (b) a grating interferometric measuring system having an optical measuring axis which intersects the object at a measuring point;
   (c) optical modulating means superposed with the object, said modulating means providing relatively high spacial frequency content matching that of the measuring system;
   (d) reflective means superposed with said object for providing at least partial reflection of incident spectra;
   (e) means for supporting the viewing system and the measuring system relative to one another such that the viewing system axis and measuring system axis intersect the object substantially coaxially and whereby the viewing point and measuring point are substantially coincident;
   (f) means providing that a spacial frequency plane of the viewing system is substantially optically coplanar with a spacial frequency plane of the measuring system to define a common spacial frequency plane, at which plane relatively high frequency spectra operatively associated with measurement are spacially separated outwardly from relatively low frequency spectra operatively associated with viewing;
   (g) reflecting means optically associated with the spacial frequency plane for selectively deflecting the high and the low frequency spectra from each other to effect axial separation thereof and whereby the separated low frequency spectra can be utilized in said viewing system;
   (h) said measuring system including photo detection means fixed relative to the viewing-measuring axis for receiving separated high frequency spectra reflected from the object; and
   (i) means for translating the object relative to the viewing-measuring axis within the plane of the object to effect visual translation of the object in the viewing system while interferometrically measuring the translation.

2. The apparatus of claim 1 wherein the optical modulating means comprises a grating superposed with said object.

3. The apparatus of claim 1 wherein the grating surface is in proximity with the surface of an object being viewed.

4. The apparatus of claim 1 wherein the reflecting means is centrally located on the viewing system axis to deflect the low frequency spectra while allowing the high frequency spectra to pass undeflected.

5. The apparatus of claim 1 wherein the grating comprises a composite comprising a first layer, of substantially transparent material having an outwardly facing planar surface and an opposite grating surface, a second partially reflective layer covering the grating surface, and a third layer, of substantially transparent material having a refractive index similar to that of the first layer, having a surface that mates with the covered second layer and an opposite outwardly facing planar surface.

* * * * *